Figure 1:
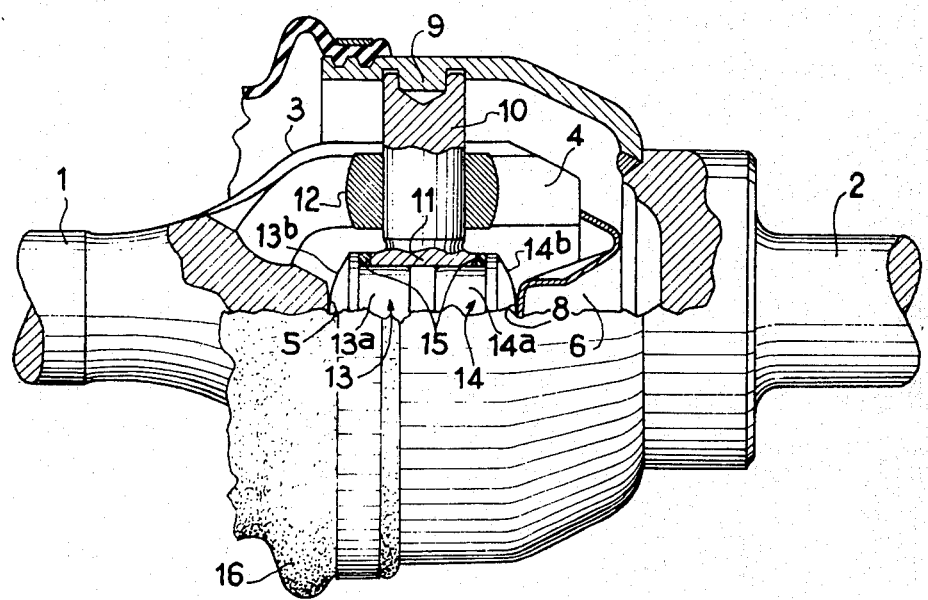

United States Patent [19]
Orain

[11] 3,990,267
[45] Nov. 9, 1976

[54] AXIALLY RETAINED HOMOKINETIC COUPLING

[75] Inventor: Michel A. Orain, Conflans Ste Honorine, France

[73] Assignee: Glaenzer-Spicer, Poissy, France

[22] Filed: Jan. 5, 1976

[21] Appl. No.: 646,592

[30] Foreign Application Priority Data
Jan. 17, 1975   France .............................. 75.01497

[52] U.S. Cl. .......................................... 64/21; 64/7; 64/8
[51] Int. Cl.² .......................................... F16D 3/30
[58] Field of Search ................................ 64/21, 8, 7

[56] References Cited
UNITED STATES PATENTS

| | | | |
|---|---|---|---|
| 3,125,870 | 3/1964 | Orain | 64/21 |
| 3,792,598 | 2/1974 | Orain | 64/21 |
| 3,805,551 | 4/1974 | Mangiaiacchi et al. | 64/8 |
| 3,818,721 | 6/1974 | Wahlmark | 64/8 |
| 3,877,251 | 4/1975 | Wahlmark | 64/8 |
| 3,942,335 | 3/1976 | Orain | 64/21 |

*Primary Examiner*—Samuel Scott
*Assistant Examiner*—Randall Heald
*Attorney, Agent, or Firm*—Wenderoth, Lind & Ponack

[57] ABSTRACT

This tripod homokinetic coupling, intended in particular to be employed in front-wheel drive automobile vehicles, is improved in order to achieve an axial retention which is a function of the torque transmitted and thereby avoid percussions which are produced in conventional arrangements or an excessive wear.

For this purpose, the axes of the raceways for the rollers on the trunnions are inclined with respect to the axis of the associated shaft so that there results on the rollers an axial force whose orientation and magnitude depend on the sign and the magnitude of the torque transmitted.

6 Claims, 2 Drawing Figures

U.S. Patent  Nov. 9, 1976  3,990,267

AXIALLY RETAINED HOMOKINETIC COUPLING

The present invention relates to homokinetic couplings of the roller type which allow large operational angles and are employed in particular for the drive of the driving and steering wheels of front-wheel drive vehicles, this coupling usually being in the form of a tripod coupling structure.

Homokinetic couplings are known which couple driving and driven shafts and are of the type comprising a first element in the form of a bell connected to one of the shafts and defining pairs of raceways and a second element connected to the other shaft and carrying rollers mounted in such manner as to be rotatable and slidable on trunnions, said rollers being received in the raceways of the bell element. Such couplings permit large operational angles of the order of 45° if there is eliminated their possibility of axial sliding by providing an axial retaining device, for example of the ball and socket type. Such an axial retaining device usually comprises two members defining thrust surfaces in the form of spherical domes integral with one of the shafts and maintained in sliding contact between two substantially planar and parallel surfaces integral with the other shaft. A spring provided between the two thrust members exert a pre-stressing force in order to ensure this contact between the spherical domes and the two planar surfaces. However, such an arrangement has the following drawbacks:

When the torque is transmitted by the coupling when rotating at an angle, the three projections on the axis of one of the shafts to be coupled of the frictional forces of the three rollers are not exactly balanced and the resulting force may exert alternating axial forces on the retaining device and produce noise due to percussions between the component parts defining respectively the thrust planes and the spherical domes. These percussions are produced if the pre-stressing exerted by the spring is not high enough. This drawback appears in particular when the torque transmitted is maximum and upon a new application having an increased torque to be transmitted, without corresponding increase in the pre-stressing, or by resonance when the frequency of the disturbing axial forces approaches the natural frequency of the axial retaining system.

Now, it is impossible to considerably increase the axial pre-stressing force exerted by the spring, owing to the limited resistances of the spherical or planar thrust surfaces of the retaining device, as concerns pressure of contact and wear. Moreover, the stiffer the spring which exerts the pre-stressing force, the quicker it collapses and shorter is its travel. Machining tolerances must be all the more narrow which complicates manufacture and increases the cost. As the permanent pre-stressing is limited therefore by these various factors, the percussion phenomenon mentioned hereinbefore results in the deterioration of the contacting surfaces of the axial retaining device and consequently in a wear of the coupling.

An object of the present invention is to overcome this drawback and to provide a homokinetic coupling of the roller type in which the axial retaining force is a function of the torque transmitted and is exerted under such conditions that there is avoided any risk of percussion, resulting in less wear and a higher degree of constancy of the characteristics in mass production.

According to the invention, there is provided a homokinetic coupling intended to be disposed between two parts which are respectively a driven part and a driving part, one of said parts being integral with a bell element defining at least two pairs of raceways, whereas the other of said parts is integral with at least three trunnions on which as many rollers are mounted, the rollers being received in the pairs of raceways, the coupling further comprising an axial retaining device comprising two thrust surfaces integral with one of the shafts and two complementary thrust surfaces integral with the other shaft, and means for exerting a force intended to apply the thrust surfaces against each other, wherein each pair of raceways is oriented in such manner as to make a given angle with respect to the direction of the axis of the associated shaft, said orientation of the raceways affording an axial pre-stressing of a magnitude which is proportional to the torque.

The axis of each pair of raceways may be rectilinear and then make the aforementioned angle with the axis of the associated shaft. The axis of each pair of raceways may also be helical, the helix angle being such that the tangent at each point of said axis makes with the axis of the shaft an angle in the vicinity of the chosen value.

According to another feature, when one of the thrust surfaces associated with one of the shafts has a hardness and strength higher than the other thrust surface associated with the same shaft, the orientation of the axes of the pairs of raceways is chosen in such manner that, in normal operation, the axial pre-stressing force exerted tends to apply the thrust surface associated with the other shaft against that of the thrust surfaces associated with the first shaft which has the highest strength.

A better understanding of the invention will be had from the ensuing description with reference to the accompanying drawing which have been given merely by way of example.

Figure 2:
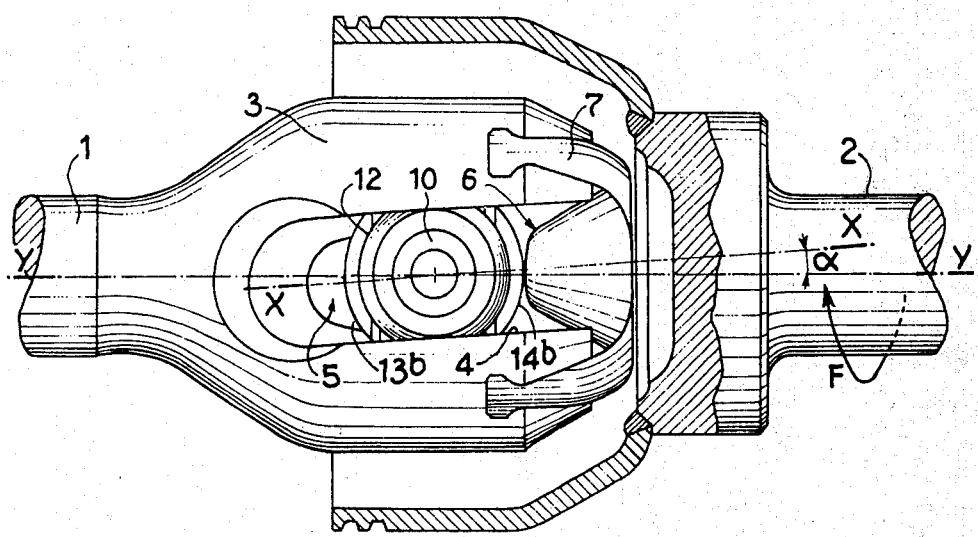

In the drawing:

FIG. 1 is an elevational view, partly in section, of an improved homokinetic coupling according to the invention, and FIG. 2 is an elevational view, partly in section, in another direction of the coupling shown in FIG. 1.

A homokinetic coupling is shown in the drawing which may be employed for the coupling between a transmission shaft and a front wheel of an automobile vehicle, this wheel being therefore a steering and driving wheel. In the illustrated embodiment it will be assumed that the shaft on the left of the drawing carrying reference numeral 1 is the driving shaft connected by a slidable tripod coupling (not shown) to the output shaft of the differential of the vehicle, and that the shaft on the right side of the drawing carrying reference numeral 2 is integral with the stub-axle of the right front wheel of the vehicle.

The shaft 1 is integral with an element 3 in the form of a bell defining three pairs of raceways 4 which are planar in the presently-described embodiment. The end of the bell defines a substantially planar thrust surface 5. The bell is integral with a star-shaped retaining element 6 comprising three branches 7 and also defining a thrust surface 8 disposed in front of the end thrust surface 5 of the bell element.

The driven shaft 2 is integral with a cup 9 in which an assembly of three trunnions 10 is mounted, the trunnions being interconnected in the part thereof adjacent the axis by a cylindrical sleeve 11. Rotatably and slidably mounted on each of the trunnions is a spherical roller 12. This roller may be mounted on the trunnion by a needle bearing or smooth surfaces as shown in the drawing.

At the two ends of the sleeve 11 there are disposed two mushroom-shaped thrust members 13, 14, each defining a cylindrical surface $13^a$, $14^a$ guidedly engaged in the sleeve and an outer thrust surface $13^b$, $14^b$ in the shape of a spherical dome in contact with the end thrust surface 5 of the bell element and with the surface 8. Preferably, two rings 15 of resilient material or steel, adapted to take up manufacturing play, are disposed between two radial facing surfaces of the sleeve and each one of the mushroom-shaped members. There may be provided between the two members 13 and 14 a relatively weak spring which biases these two members outwardly. Such a spring is however optional and has not been shown in the drawing. The coupling is protected by an elastomer bellows or gaiters 16.

According to the invention and as can be seen in FIG. 2, the axes such as X—X of each pair of raceways are inclined with respect to the direction of the axis Y—Y of the shaft 1, the angle α determining this inclination being for example between about 1° and 3° and preferably between 1° and 2°. If, as in the presently-described embodiment, the raceways are planar, it is sufficient to offset these raceways so that they have the desired inclination, which consequently poses no particular machining problem. However, the invention is also applicable to the case where the axis of each pair of raceways is helical, the tangent at each point of the helix making with respect to the direction Y—Y an angle between the aforementioned limits.

Owing to the feature of the invention, when the coupling is driven in rotation in the direction indicated by arrow F, which corresponds to the most frequent utilisation corresponding to a forward travel of the vehicle, the inclination of the raceways with respect to the axis of the shaft produces an axial pre-stressing force which is exerted onto the rollers and tends to apply the spherical dome $13^b$ against the thrust surface 5 of the end of the bell element. As these two parts are usually of very hard cemented steel and the axial retaining force is constantly adapted to the magnitude of the torque transmitted, the wear which results therefrom is minimum since the torques the most frequently employed, for example those afforded by the highest gear ratio of the gearbox, represent only a fraction of the maximum possible torque. Moreover, this adaptation of the axial force to the magnitude of the torque transmitted permits avoiding all the shocks or percussions between the various component parts constituting the retaining device and thus avoids the drawback inherent in conventional devices. When the direction of the torque is reversed, the pre-stressing is also exerted in the reverse direction and the device operates with the same characteristics and advantages. The drawback due to the presence of a spring is also eliminated, and the rate of pre-stressing, once determined by calculation and trials and resulting in a choice of the value of the angle α, is achieved in a sure manner and with no risk of error when mass-producing the coupling and does not vary during the use of the coupling. This arrangement therefore has distinct advantages over the pre-stressing device having a spring whose regular rate posed problems for a mass-production at low cost.

Owing to the presence of the washers 15 interposed between the sleeve 11 and the thrust members 13, 14, in the case of a sudden reverse in the torque transmitted, which is rare but always possible in particular when the foot is lifted off the accelerator of the vehicle, percussion noise which would be produced in the case of play in the device is completely avoided.

Thus it can be seen that the invention affords, by a very simple modification of one of the component parts of the coupling, very important results in particular as concerns comfort, efficiency and performance of such a coupling.

Having now described my invention what I claim as new and desire to secure by Letters Patent is:

1. In a homokinetic coupling comprising a driven part having an axis of rotation, and a driving part having an axis of rotation, a bell element integral with one of said parts and defining at least three pairs of raceways, at least three trunnions integral with the other of said parts, rollers respectively rotatably mounted on the trunnions and respectively received between the pairs of raceways, an axial retaining device comprising two thrust surfaces integral with one of said parts and two complementary thrust surfaces which are integral with the other of said parts, and means for exerting a force tending to apply the thrust surfaces against each other; the improvement wherein each pair of raceways is oriented in such manner as to make a given angle with respect to the direction of the axis of the associated part, said orientation of the raceways affording an axial pre-stressing of a magnitude which is proportional to the torque transmitted by the coupling.

2. A homokinetic coupling as claimed in claim 1, wherein each pair of raceways is rectilinear and has an axis which makes with respect to the direction of the axis of the associated part an angle of the order of about 1°–3° and preferably 1°–2°.

3. A homokinetic coupling as claimed in claim 2, wherein said angle is 1°–2°.

4. A homokinetic coupling as claimed in claim 1, wherein each pair of raceways is helical and the helix angle is such that the tangent at each point of the helix makes with respect to the direction of the axis of the associated shaft an angle of about 1°–3°.

5. A homokinetic coupling as claimed in claim 1, wherein the orientation of the pairs of raceways is so chosen that, in normal operation, the axial pre-stressing force tends to apply the strongest of said thrust surfaces against each other.

6. A homokinetic coupling as claimed in claim 1, wherein the two thrust members associated with one of the parts are slidably mounted in a support, and a ring is interposed between each one of said slidable members and the support to take up play.

* * * * *